United States Patent Office 3,519,573
Patented July 7, 1970

3,519,573
STEAM-OXYGEN ACTIVATION OF NICKEL-MOLYBDENUM CATALYSTS
Richard H. Coe, Seabrook, Tex., assignor to Shell Oil Company, New York, N.Y., a corporation of Delaware
No Drawing. Continuation-in-part of application Ser. No. 321,445, Nov. 5, 1963. This application May 11, 1967, Ser. No. 637,620
Int. Cl. B01j 11/74, 11/76
U.S. Cl. 252—439     3 Claims

ABSTRACT OF THE DISCLOSURE

A fresh nickel-molybdenum catalyst is activated by a treatment with a gaseous mixture of steam and oxygen (or air) under controlled conditions at a temperature of about 750° F.

CROSS-REFERENCE TO RELATED APPLICATIONS

This is a continuation-in-part of application Ser. No. 321,445, filed Nov. 5, 1963, now abandoned.

BACKGROUND OF THE INVENTION

Field of the invention

This invention relates to the hydrofining of hydrocarbon fractions. More particularly, this invention relates to a method for treating a catalyst to improve its activity for the hydrofining of hydrocarbon fractions.

Description of the prior art

Hydrofining is a well-known process for the treatment of a variety of hydrocarbon fractions in order to improve various properties thereof. For example, naphtha fractions are subjected to hydrofining to remove sulfur and nitrogen compounds which may interfere with or adversely affect the reforming of such naphtha fractions with platinum/alumina catalyst. Kerosene, heating oil, diesel fuel lubricating oils, and even paraffin and microscrystalline waxes are subjected to hydrofining to improve color, odor, burning characteristics, storage stability or the like. The hydrofining process comprises maintaining the particular hydrocarbon fraction in liquid, vapor, or mixed liquid-vapor form in admixture with hydrogen at elevated temperatures and pressures in contact with a suitable hydrofining catalyst for a period sufficient to effect the desired improvement.

A variety of catalysts has been proposed for hydrofining hydrocarbon fractions and in general comprise one or more metals having hydrogenation activity. Usually, the catalyst comprises a Group VI-B metal in combination with an Iron Group metal such as the well known nickel-tungsten sulfide catalyst. Hydrofining catalysts in general use today comprise molybdenum in combination with cobalt and/or nickel dispersed on a porous support. In general, the catalysts are prepared by first forming alumina particles or pellets in any suitable or known way and then compositing the molybdenum and the cobalt and/or nickel therewith. The metals can be added in any suitable manner although the impregnation method is convenient and provides a suitable catalyst. In the impregnation method, the porous support is impregnated with soluble metal salts which are readily decomposed by calcination. The molybdenum can be added as a solution of ammonium molybdate or molybdic acid. The cobalt and/or nickel is usually added as the nitrate or acetate. The impregnation can be carried out by first adding one metal and then adding another metal or by adding all the metals from a common solution. After the metals have been impregnated onto the catalyst, the catalyst is dried and calcined to convert the metals to the oxide form. The finished catalyst may contain from about 5 to 25% w., calculated as the metals, of the hydrogenation components.

The hydrofining catalyst is usually sulfided prior to use. For example, in a typical operation the catalyst is heated to about 400° F. in hydrogen (or nitrogen) at which temperature the sulfiding is effected with a medium rich in sulfur compounds, for example, a mixture of hydrogen and hydrogen sulfide, generally about 1–10% v. hydrogen sulfide. For nickel-molybdenum hydrofining catalysts, high hydrogen sulfide concentration, e.g., on the order of 5–10% v., are preferred. Upon completion of the sulfiding, the catalyst is heated to hydrofining temperature and the hydrocarbon fraction to be treated is admitted to the catalyst to commence normal operation. In an alternative manner, the catalyst can be sulfided with a sulfur-containing hydrocarbon fraction, preferably an olefin-free hydrocarbon fraction. The sulfiding naphtha should generally contain on the order of 2% w. sulfur and, if necessary, decomposable sulfur compounds such as n-butyl mercaptan are usually added to the hydrocarbon fraction to provide the desired amount.

The hydrofining catalyst is conventionally employed as a fixed bed suitable supported within a reactor by means of a metal grid, ceramic balls or the like. Flow through the catalyst bed can be upflow or downflow. With downflow operation, which is preferred, it is generally advisable to provide scale traps to prevent plugging of the catalyst bed with sulfide scale and a layer of inert balls or other means for distributing the incoming vapor stream and for protecting the catalyst particles from attrition by the incoming vapor.

The hydrofining operation is conducted over a range of conditions depending upon the nature of the feed, the character and uniformity of the impurity to be removed and the degree of improvement desired. In general, the hydrofining operation is carried out at a temperature in the range from about 400–750° F., a pressure of about 500–750 p.s.i.g., a volumetric liquid hourly space velocity from about 0.5–5 and a hydrogen-to-oil mole ration from about 1:1 to 10:1.

SUMMARY OF THE INVENTION AND DESCRIPTION ON PREFERRED EMBODIMENTS

Hydrofining catalysts comprising molybdenum are considered to have good hydrofining activity. It has now been discovered that activity of nickel molybdenum hydrofining catalyst is improved by a treatment with a gas comprising a mixture of steam and oxygen at a temperature of about 750° F. Air is a convenient and practical source for the oxygen. Surprisingly, the activity of cobalt molybdenum hydrofining catalyst is not improved by such a treatment but, in fact, is actually decreased by such a treatment. Thus, the nickel-molybdenum hydrofining catalyst should contain no cobalt or at most no more than about 0.1% w. and preferably no more than about 0.5% w. The improvement in activity of the nickel-molybdenum hydrofining catalyst allows the subsequent hydrofining reactions to proceed at lower temperatures. Moreover, ultimate life of the catalyst is increased.

To carry out the activation treatment with a bed of fresh nickel-molybdenum hydrofining catalyst, the catalyst is heated with hot air (other gases such as nitrogen can be used if desired) to a temperature above the condensation temperature of steam so that condensation of steam within the catalyst bed is avoided. For steam at about atmospheric pressure, i.e., when the steam is discharged from the reactor to the atmosphere, to about 150 p.s.i.g., the reactor bed should be heated to a temperature of at least 250–400° F. and even higher before steam is admitted to the reactor. Steam is admitted to the hot catalyst and the relative proportions of steam and air are adjusted to provide less than about 15% $O_2$, preferably less than about 1% $O_2$. In general, at least about 0.1% $O_2$ should be used. Reactor inlet temperature is adjusted to about 750° F. and the activation treatment with the mixture of steam and air is continued for a period of about 1–20 hours. By temperatures of about 750° F. it is meant to include those temperatures within about 100° F. above or below this temperature. At temperatures below about 650° F. there is little benefit to be obtained by the activation treatment. At temperatures above about 850° F., benefit from the activation treatment is not only reduced but the treatment can actually be harmful. After the activation treatment, temperature of the catalyst bed is lowered to about 450° F. and preferably about 400° F. and the flow of steam and air are discontinued. The reactor is then purged with inert gas, such as nitrogen, to remove air following which the catalyst is sulfided. To effect sulfiding, for example, a flow of sulfiding gas comprising a mixture of hydrogen and hydrogen sulfide (e.g., 5–10% v. hydrogen sulfide) is established. Sulfiding is continued at 400° F. until breakthrough as indicated by a sharp rise in the concentration of hydrogen sulfide in the effluent gas. After this initial breakthrough, temperature is increased stepwise to about 600° F. to effect the sulfiding over a temperature in the range of 400–600° F. Upon completion of the sulfiding operation, flow of hydrogen sulfide is discontinued and the temperature of the catalyst bed is adjusted to hydrofining temperature by a flow of hot hydrogen before introducing the hydrocarbon fraction to be processed.

Hydrofining activity is the ability of a catalyst to remove impurities such as nitrogen, sulfur and oxygen components from hydrocarbon fractions. It is also well known that conversion of nitrogen compounds is the more difficult reaction in hydrofining. Therefore, as used in the present specification, the measure of hydrofining activity is taken to be hydrodenitrification activity. The activity is the temperature required to effect a desired degree of organic conversion to ammonia. As will be discussed in Example I the hydrodenitrification activity is conveniently measured as the temperature required to obtain 95% nitrogen removal in a petroleum gas/oil fraction.

EXAMPLE OF EMBODIMENTS OF THE INVENTION

Example I

In this example, three commercial hydrofining catalysts comprising molybdenum oxide in combination with cobalt oxide and/or nickel oxide on an alumina support were tested for their hydrofining ability with and without various pretreatments prior to sulfiding. The hydrogenation metal content of these catalysts are as follows:

TABLE I

| Hydrogenation component | Co/Mo | Ni/Mo | Ni/Co/Mo |
|---|---|---|---|
| $MoO_3$, percent wt | 12.0 | 12.0 | 12.0 |
| CoO, percent wt | 2.5 | | 1.0 |
| NiO, percent wt | | 2.5 | 2.0 |

For the hydrofining activity test, a naphtha having a nominal 200/390° F. ASTM IBP/EP comprising a mixture of straight run (65% v.) and thermally cracked (35% v.) naphtha was processed using once through hydrogen at a pressure of 700 p.s.i.g., 5.0 LHSV and hydrogen to oil mole ratio of 1:1. Temperature was varied in the range from about 600–675° F. to vary the amount of denitrification. Activity is indicated as the temperature at which 95% denitrification is obtained. Representative properties of the naphtha are 102 p.p.m. w. basic nitrogen, 120 p.p.m. w. total nitrogen, 5600 p.p.m. w. total sulfur and a bromine number of 31.4 g./100 g.

After pretreatment but prior to the activity test, each catalyst was sulfided by the following procedure. The catalyst was heated to 400° F. in hydrogen (or nitrogen) and the sulfiding was carried out at this temperature with a sulfur-containing olefin-free naphtha. The naphtha was similar to that used in the activity test, except that it has been subjected to a previous hydrotreatment to render it substantially olefin-free. Sulfur as n-butyl mercaptan was added to the naphtha to provide 2% w. sulfur. The sulfiding was effected at 250 p.s.i.g., 1.5 LHSV and 1.5:1 hydrogen/oil mole ratio until the effluent gas contained greater than 1% v. $H_2S$. The flow of sulfur-containing feed was discontinued and the temperature was raised to 600° F. at 100° F. per hour while continuing the flow of hydrogen at which temperature the untreated naphtha feed was introduced to commence normal operation. The catalysts used in these tests were all fresh, i.e., had not been previously used. As a basis for comparing the effects of the various pretreatments, activity for each fresh catalyst, sulfided prior to use, is assigned a value of 100. The various pretreatments and the activity relative to the respective sulfided fresh catalyst are given in Table II.

TABLE II

| | Activity | | |
|---|---|---|---|
| | Co/Mo | Ni/Mo | Ni/Co/Mo |
| (1) No pretreatment | 100 | 100 | 100 |
| (2) Calcine in $N_2$: 900° F., 200 p.s.i.g. | 100 | 100 | 100 |
| (3) Pretreat with steam/2.5% v. air: 750° F., atmospheric pressure, 16 hours | 100 | 136 | 82 |
| (4) Pretreat with steam/2.5% v. air: 750° F., 100 p.s.i.g., 16 hours | 76 | 136 | 93 |

From the above results, it can be clearly seen that the activation treatment of the process of the invention improves the activity of the fresh nickel-molybdenum hydrofining catalyst. On the other hand activity is reduced for the catalyst comprising cobalt in combination with molybdenum.

Example II

As shown in Example I, treatment of fresh nickel-molybdenum catalyst with steam containing 2.5% v. air at 750° F. at atmospheric pressure for 16 hours improved the denitrification activity about 35%. In additional tests, a similar treatment at 880° F. was also beneficial but activity increase was only about 20%, and with similar treatment at 650° F. the activity improvement was only about 20%.

In another test, fresh nickel-molybdenum hydrofining catalyst was treated with steam without the addition of air at a temperature of 750° F. and atmospheric pressure for 16 hours. The catalyst was then sulfided, the sulfiding being continued to 750° F. after $H_2S$ breakthrough at the initial temperature of 400° F. Denitrification activity of the catalyst treated in this manner was decreased by about 24%.

I claim as my invention:

1. A method for activating a fresh nickel oxide-molybdenum oxide on alumina catalyst which comprises treating the catalyst with a gas mixture comprising steam and from about 0.1 to 15.0% v. oxygen at a temperature of about 750° F., and sulfiding the treated catalyst.

2. The method of claim 1 wherein the gaseous mixture comprises steam and air.

3. The method of claim 1 wherein the sulfiding is effected at a temperature of about 400° F. to 600° F.

References Cited

UNITED STATES PATENTS

| 2,813,835 | 11/1957 | Nozaki | 252—411 |
| 2,963,419 | 12/1960 | Holm et al. | 252—416 |
| 3,076,755 | 2/1963 | Stark et al. | 252—416 |
| 3,242,101 | 3/1966 | Erickson et al. | 252—465 |

DANIEL E. WYMAN, Primary Examiner

P. E. KONOPKA, Assistant Examiner

U.S. Cl. X.R.

208—216, 254; 252—411, 419, 420, 470

PO-1050
(5/69)

UNITED STATES PATENT OFFICE
CERTIFICATE OF CORRECTION

Patent No. 3,519,573      Dated July 7, 1970

Inventor(s) Richard H. Coe

It is certified that error appears in the above-identified patent and that said Letters Patent are hereby corrected as shown below:

Col. 2, line 55, change "0.5" to -- 0.05 --.

SIGNED AND
SEALED
OCT 20 1970

(SEAL)
Attest:

Edward M. Fletcher, Jr.
Attesting Officer

WILLIAM E. SCHUYLER, JR.
Commissioner of Patents